United States Patent
Roychoudhury et al.

(10) Patent No.: US 8,444,951 B2
(45) Date of Patent: *May 21, 2013

(54) CATALYTIC PROCESS AND SYSTEM FOR CONVERTING LIQUID FUELS INTO SYNGAS

(75) Inventors: Subir Roychoudhury, Madison, CT (US); Maxim Lyubovsky, Fairfax, VA (US); Curtis Morgan, Ansonia, CT (US); Joel DesJardins, Vernon, CT (US); Dennis E. Walsh, Richboro, PA (US)

(73) Assignee: Precision Combustion, Inc., North Haven, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/924,876

(22) Filed: Oct. 6, 2010

(65) Prior Publication Data

US 2011/0061299 A1    Mar. 17, 2011

Related U.S. Application Data

(63) Continuation-in-part of application No. 12/080,600, filed on Apr. 4, 2008, which is a continuation-in-part of application No. 11/592,825, filed on Nov. 3, 2006.

(60) Provisional application No. 60/733,643, filed on Nov. 4, 2005.

(51) Int. Cl.
*C01B 3/26*   (2006.01)

(52) U.S. Cl.
USPC ............. 423/652; 423/650; 423/651

(58) Field of Classification Search
USPC .......................... 423/650, 651, 652
See application file for complete search history.

(56) References Cited

U.S. PATENT DOCUMENTS

| 4,115,074 A |   | 9/1978  | Yoshida et al. |
|-------------|---|---------|----------------|
| 4,255,121 A |   | 3/1981  | Sugimoto |
| 4,298,355 A |   | 11/1981 | Staudinger |
| 4,381,187 A |   | 4/1983  | Sederquist |
| 4,921,765 A | * | 5/1990  | Gmeindl et al. ............. 429/411 |
| 5,026,536 A |   | 6/1991  | Shioiri et al. |
| 5,051,241 A |   | 9/1991  | Pfefferle |

(Continued)

FOREIGN PATENT DOCUMENTS

| DE | 19930051 A1 | 1/2001 |
| WO | WO 2004060546 A2 | 7/2004 |

OTHER PUBLICATIONS

The specification of U.S. Appl. No. 10/324,464 placed in the file for applicant's convenience (Dec. 19, 2002).*

(Continued)

*Primary Examiner* — Paul Wartalowicz (57) ABSTRACT

The present invention provides a process and apparatus for the gasification of a liquid fuel and includes providing a supply of a liquid fuel, a supply of oxidant, and a supply of liquid water; atomizing the liquid fuel and mixing it with the oxidant and steam; catalytically reacting the fuel-oxidant-steam mixture in a catalyst bed; initiating the catalytic reaction with an ignition source; positioning a heat exchanger in proximity with the catalyst bed so as to convert the liquid water to steam; and feeding the steam into the catalytic reaction, thereby eliminating the need for a liquid fuel vaporizer. A preferred catalyst bed includes an ultra-short-channel-length metal substrate.

11 Claims, 8 Drawing Sheets

U.S. PATENT DOCUMENTS

| | | | |
|---|---|---|---|
| 5,069,685 A | 12/1991 | Bissett et al. | |
| 5,234,168 A * | 8/1993 | Abboud | 239/424 |
| 6,284,398 B1 | 9/2001 | Kiryu | |
| 6,641,625 B1 | 11/2003 | Clawson et al. | |
| 6,755,021 B2 | 6/2004 | Johansson | |
| 6,767,518 B2 | 7/2004 | Ichikawa et al. | |
| 6,783,742 B2 | 8/2004 | Bentley et al. | |
| 6,869,456 B2 | 3/2005 | Salemi et al. | |
| 7,037,485 B1 | 5/2006 | Drnevich et al. | |
| 7,156,886 B2 | 1/2007 | Nakamura et al. | |
| 2002/0071790 A1 | 6/2002 | Woods et al. | |
| 2002/0083646 A1 | 7/2002 | Deshpande et al. | |
| 2002/0172630 A1 * | 11/2002 | Ahmed et al. | 422/190 |
| 2003/0072700 A1 | 4/2003 | Goebel et al. | |
| 2005/0028445 A1 | 2/2005 | Roychoudhury et al. | |
| 2005/0229490 A1 * | 10/2005 | Stevens et al. | 48/198.7 |
| 2005/0274107 A1 | 12/2005 | Liu et al. | |
| 2006/0179717 A1 | 8/2006 | LaBarge | |
| 2007/0084118 A1 | 4/2007 | Kaeding et al. | |
| 2007/0151154 A1 | 7/2007 | Lyubovsky et al. | |
| 2008/0127553 A1 | 6/2008 | Roychoudhury et al. | |
| 2008/0169449 A1 | 7/2008 | Mundschau | |
| 2009/0228146 A1 | 9/2009 | Roychoudhury et al. | |
| 2009/0252661 A1 | 10/2009 | Roychoudhury et al. | |
| 2009/0293358 A1 | 12/2009 | Roychoudhury et al. | |

OTHER PUBLICATIONS

Copending U.S. Appl. No. 12/460,543, entitled "Reactor Flow Control Apparatus," filed Jul. 21, 2009, in the name of Subir Roychoudhury, et al.

* cited by examiner

| | |
|---|---|
| $H_2$ | 32.45 |
| $O_2$ | 0.00 |
| $N_2$ | 42.44 |
| $CH_4$ | 0.35 |
| CO | 15.78 |
| $CO_2$ | 8.98 |
| Ethylene | 0.00 |
| Ethane | 0.00 |
| Propylene | 0.00 |
| Propane | 0.00 |

FIG. 11

CATALYTIC PROCESS AND SYSTEM FOR CONVERTING LIQUID FUELS INTO SYNGAS

CROSS-REFERENCE TO RELATED APPLICATIONS

This application is a continuation-in-part of U.S. patent application Ser. No. 12/080,600, filed Apr. 4, 2008, which is a continuation-in-part of U.S. patent application Ser. No. 11/592,825, filed Nov. 3, 2006, which claims the benefit of U.S. Provisional Application No. 60/733,643 filed Nov. 4, 2005.

GOVERNMENT RIGHTS

This invention was made with government support under Government Contract No. W56 HZV-04-0688. The U.S. Government has certain rights in this invention.

BACKGROUND OF THE INVENTION

1. Field of the Invention

The present invention is directed to a method and system for reactively converting a liquid fuel into a gasified stream. More particularly, the method and system of the present invention provide a novel means for converting the liquid fuel into a gas by catalytic partial oxidation. In addition, when fuels containing sulfur are used, a method and device according to the present invention can be employed to provide de-sulfurization.

2. Brief Description of Related Art

Gasification of liquid fuels, referred to as "liquid fuel reforming," typically comprises use of a vaporizer. Vaporization of liquid fuels (e.g., alcohols, hydrocarbons) typically is achieved by indirectly supplying heat into a stream of liquid fuel via heat exchange with a hot wall. One disadvantage of this method is that the rate of vaporization is limited by the rate of heat transfer such that a relatively large surface area is required for fuel vaporization. Another disadvantage of this method, especially for vaporizing long chain hydrocarbons, is that heating the fuel stream to the vaporization temperature tends to cause fuel decomposition and formation of deposits. More specifically, coke formation is problematic. Moreover, preventing deposits from forming within fuel passages in a liquid fuel delivery nozzle during steady state process operation is challenging, due to heat-up of the nozzle from the downstream reaction zone ("hot zone").

Another known method for gasification of a fuel stream comprises mixing atomized fuel with a hot gas such as superheated steam that supplies the heat required for fuel vaporization and prevents coke formation. However, the large amounts of superheated steam provided by an external steam source required in this method result in a large heat load for steam production.

Spray methods for atomization of liquid fuels known in the art include air-blast or pressure atomizers, ultrasonic and electrospray atomizers. These spray systems are capable of providing a uniform distribution of atomized fuel across the entrance of a catalyst bed in a reforming reactor. Such atomizers may include a co-flow of air that allows mixing of the fuel and oxidizer; however, very fine and uniform droplet size and homogeneous fuel-air distribution, required to avoid coke formation and obtain temperature/mixture uniformity in the reactor, are difficult to achieve in practical spray systems.

Ignition devices, such as spark or glow plugs, are widely used to ignite fuel-oxidizer mixtures at startup. These devices often are subject to failure due to their exposure to high operating temperatures by virtue of their location required for ignition.

Monoliths are commonly used catalyst substrates for the gasification of liquid fuel. Inhomogeneities in a fuel-oxidizer mixture are usually detrimental to monolith substrates leading to localized lean or rich zones, respectively, causing hot spots or carbon precipitation regions. Little opportunity exists for these zones to re-mix, because the channels in the monolith substrate are long and separated from each other; thus monolith substrates are particularly vulnerable. In addition, carbon deposition is favored in monoliths due to build-up of boundary layers that develop on the surface of channels in these substrates.

Combustion of liquid fuels in fuel cell or internal combustion engine systems poses significant problems, especially for fuels with high aromatic content and wide boiling point distribution. This can be attributed to the propensity of heavier aromatic compounds in the fuel to form deposits or coke when vaporized at high temperatures.

Liquid hydrocarbon fuels such as gasoline, kerosene or diesel may be used with high temperature solid oxide fuel cells ("SOFC") to directly produce electric power. For SOFC fuel cells, the choice of fuel is not limited to pure hydrogen as is the case for low temperature proton exchange membrane ("PEM") fuel cells. Conversion of the hydrocarbon fuel into a gaseous mixture containing hydrogen ($H_2$) and carbon monoxide (CO) (hereinafter "syngas") is required before the fuel may be fed to the SOFC. Furthermore, removal of sulfur normally contained in the fuel is needed prior to feeding the gaseous reformate to the SOFC.

U.S. Pat. No. 4,255,121 (hereinafter "Sugimoto") discloses a reforming process and apparatus to produce a gaseous fuel. The process involves atomizing a mixture of fuel and liquid water; feeding air to the atomized mixture and heating the resulting mixture of misted fuel, air, and water; partially-combusting the heated mixture over a bulk metal catalyst; adding additional air to the partially-combusted mixture and burning in flame. Heating is obtained with a conventional heating element wound around the length of the apparatus including the area surrounding the nozzle where fuel is introduced. Moreover, the bulk metal catalyst inherently has low surface area and thus unacceptable catalytic activity. Sugimoto fails to teach steam production and heat integration; and the cited process is not self-sustaining (autothermal).

U.S. Pat. No. 7,037,485 B1 (hereinafter "Drnevich, et al.") discloses a multi-component chemical plant for steam reforming methane. In a first reactor, a feed stream of natural gas and optionally olefinic hydrocarbons is reacted over a catalyst capable of promoting either hydrogenation or partial oxidation. Heat from the reaction is collected in a heat exchanger and used to produce steam, which is stored in a steam drum. The stored steam is later fed into a second reactor, specifically a natural gas-tail gas reformer, to produce hydrogen. Drnevich, et al. does not disclose feeding steam so produced back into the first reactor for heat integration or self-sustenance.

These and other known methods and systems for gasification of liquid fuels are described further in U.S. patent application Ser. No. 10/902,512, filed on Jul. 29, 2004, now published as US 2005/0028445 A1 (hereinafter "Roychoudhury, et al."). Specifically, Roychoudhury, et al. discloses a method and system for gasification of a liquid fuel involving contacting a fuel-oxidant mixture in a short-contact-time, ultra-short-channel-length metal substrate catalytic reactor. Roy- Choudhury, et al. fails to disclose internal production of steam and use thereof in providing for a self-sustaining process.

U.S. Pat. No. 5,051,241 (Pfefferle) discloses a Microlith® ultra-short-channel-length catalytic reactor having flow channels less than about one millimeter in length and having a ratio of channel length to channel diameter of less than about 2/1.

U.S. Pat. No. 5,069,685 (Bissett, et al.) discloses coal gasification involving a hot fuel gas desulfurization step.

An improved gasification and pre-reforming of liquid fuel would resolve many of the issues noted above with respect to the prior art. It would therefore be desirable to provide a pre-reforming reactor for partially oxidizing and cracking heavy hydrocarbon components of a range of liquid fuels. The pre-reformed fuel, which would be rich in hydrogen and carbon monoxide, subsequently could be further reformed or combusted to power fuel cell systems, internal combustion engines, burners, and other energy-producing devices.

In such a gasifier or pre-reformer (if the reformed fuel is to be further reformed), it would be desirable to provide cold vaporization of the liquid fuel, so as to eliminate the conventional large and costly vaporizer and to avoid formation of coke deposits. The term "cold" as used herein shall mean that the fuel entering the fuel delivery nozzle and until it exits the nozzle remains at a temperature below the coking temperature of the fuel. Preferably, the fuel entering the nozzle and until it exits the nozzle remains at a temperature ranging from about −20° C. to about 50° C. Accordingly, it would also be desirable to achieve rapid start-up with a cold fuel, which shall be taken to mean a start-up time ranging from about 15 seconds to about 1.5 minutes to reach steady state operation. It would also be desirable to provide a method whereby no external pre-heating of either air or fuel is required.

It is still further desirable to provide a catalyst substrate that facilitates mixing of the stream flowing there through, so as to minimize as much as possible rich or lean zones. Such a configuration would result in a comparatively high conversion rate of the reactants selectively to the desired products, would help to minimize high and low temperature regions, and minimize breakthrough of unreacted fuel.

It would also be desirable to provide a catalytic reactor for the gasification of liquid fuels comprising a catalyst that yields partial oxidation products, preferably, CO and $H_2$ in contrast to complete oxidation products, namely, carbon dioxide ($CO_2$) and water ($H_2O$). This results in a higher selectivity to desirable products ($CO+H_2$) for the same amount of added air and produces hydrogen-rich gas directly from the gasifier reactor. It would be further desirable to add steam to the reforming process to control the quantity of hydrogen produced without, however, increasing the energy and cost burdens of producing steam.

It would also be desirable to achieve a steady state operation such that the reforming reaction does not run-away from too much heat production with consequential unacceptable increase in $CO_2$ and $H_2O$ yields, or alternatively, does not slow-down from inadequate heat production with consequential coking and unacceptable liquid fuel conversion.

Lastly, it would be beneficial to provide de-sulfurization of the gaseous reformate when required by a particular application of the gasification system taught herein. Desulfurization with zinc oxide, as commonly known in the art, requires control on the temperature of the reformate stream entering the desulfurization unit. Notably, the inlet temperature to the desulfurizer should be less than about 400° C.

SUMMARY OF THE INVENTION

In one aspect, this invention provides for a process of reforming a liquid fuel comprising:

(a) providing a supply of a liquid fuel;
(b) providing a supply of an oxidant;
(c) providing a supply of liquid water;
(d) atomizing the liquid fuel through a nozzle into a mixer such that the fuel entering the nozzle and before exiting the nozzle is maintained at a temperature below the coking temperature of the fuel;
(e) feeding the oxidant into the mixer and mixing the atomized fuel with the oxidant;
(f) catalytically reacting the fuel-oxidant mixture in the presence of steam in a catalytic reactor thereby producing gaseous reformate; wherein the catalytic reactor comprises an ultra-short-channel-length metal substrate having supported thereon one or more noble metals;
(g) initiating the catalytic reaction of step (f) with an ignition source located proximate to the catalyst bed but at a distance from the nozzle sufficient to maintain the temperature requirement of step (d);
(h) contacting the gaseous reformate with a heat exchanger positioned proximate to the catalytic reactor such that a hot side of the heat exchanger contacts the gaseous reformate and a cold side of the heat exchanger contacts the supply of water;
(i) transferring heat from the gaseous reformate via the heat exchanger to the liquid water to produce steam; and
(j) providing the steam to the fuel-oxidant mixture in the catalytic reaction of step (f).

In a second aspect, this invention provides a system for gasification of a liquid fuel comprising:

(a) a first inlet terminating in a nozzle for supplying and atomizing a cold liquid fuel into a mixing region;
(b) a second inlet for supplying an oxidant into the mixing region;
(c) a supply of liquid water external to the mixing region;
(d) a mixing region in fluid communication with the first inlet and nozzle for mixing the atomized fuel with the oxidant;
(e) a catalytic reactor located in fluid communication with the mixing region and comprising an ultra-short-channel-length metal substrate having supported thereon one or more noble metals;
(f) an ignition source for initiating a catalytic reaction, the source located proximate to the catalyst bed but downstream of the nozzle so as to maintain cold atomization of the liquid fuel in part (a);
(g) a heat exchanger positioned proximate to the catalytic reactor such that a hot side of the heat exchanger contacts gaseous reformate exiting the catalytic reactor and a cold side of the heat exchanger contacts the supply of liquid water to produce steam;
(h) a means for feeding the steam to the mixing region.

The system of the present invention eliminates the need for a liquid fuel vaporizer in a typical gasification system. By eliminating the vaporizer, an essential and critical part of the reforming systems known in the art, the entire system is less complex and more robust. Vaporizing hydrocarbon fuels is difficult because of low decomposition temperature of these fuels which leads to coke deposits and clogging of the fuel delivery lines. In the present invention, spraying cold fuel directly into the catalyst bed eliminates these problems.

In an important embodiment of this invention, a heat exchanger is positioned downstream of the catalyst bed thereby utilizing heat generated in the reforming reaction to produce steam required for the system, while simultaneously cooling the reformate stream to the temperature required by downstream components, e.g., de-sulfurization bed. Moreover, cycling steam so produced to the catalytic reactor provides heat integration for a self-sustaining reaction and provides control over the amount of hydrogen produced.

In yet another embodiment of this invention, a de-sulfurization bed is positioned downstream of the catalyst bed providing for de-sulfurization of the gaseous reformate product. In other systems known in the art, de-sulfurization is achieved by de-sulfurization of the fuel in the liquid form in a hydro-de-sulfurization ("HDS") process prior to the reforming process. In contrast, the present invention eliminates the complex apparatus and method of liquid fuel de-sulfurization.

The method and system of the present invention provide gasification of liquid fuel to a gaseous reformate, preferably a mixture of $H_2$ and CO ("syngas"), without a requirement for supplying external heat or external steam to the gasifier. Fuel and air may be supplied to the gasifier at ambient temperatures. This allows a smaller mixing volume and a simpler fuel and air delivery system design. This also allows a means for start-up and operation in the absence of initial heat at the reactor inlet. More importantly, the method and system of the present invention provide a means for the gasification of a liquid fuel without the use of an external vaporizer.

DETAILED DESCRIPTION

The present invention as described hereinabove provides a system and corresponding process for converting a liquid fuel into a gaseous reformate, preferably, comprising CO and $H_2$. The system comprises the following components:

(a) a first inlet terminating in a nozzle for supplying and atomizing a cold liquid fuel into a mixing region;

(b) a second inlet for supplying an oxidant into the mixing region;

(c) a supply of liquid water external to the mixing region;

(d) a mixing region in fluid communication with the first inlet and nozzle for mixing the atomized fuel with the oxidant;

(e) a catalytic reactor located in fluid communication with the mixing region and comprising an ultra-short-channel-length metal substrate having supported thereon one or more noble metals;

(f) an ignition source for initiating a catalytic reaction, the source located proximate to the catalyst bed but downstream of the nozzle so as to maintain cold atomization of the liquid fuel in part (a);

(g) a heat exchanger positioned proximate to the catalytic reactor such that a hot side of the heat exchanger contacts gaseous reformate exiting the catalytic reactor and a cold side of the heat exchanger contacts the supply of liquid water to produce steam;

(h) a means for feeding the steam to the mixing region.

Liquid fuels suitable for the process of this invention include any hydrocarbon or alcohol fuel that is a liquid at a temperature ranging between about $-20°$ C. and about $+50°$ C. at about atmospheric pressure, taken as about 1 atm (101 kPa). Examples of suitable liquid fuels include diesel fuel, kerosene, dodecane, light oil, methanol, ethanol, and any of the logistic fuels including JP-8, JP-5, and Jet A fuels. Preferred is JP-8 fuel. In most applications, oxygen is a preferred oxidant; while oxygen as a constituent of air is most preferred. For purposes of this description, the terms "oxidant" and "oxidizer" shall have the same meaning and are used interchangeably.

The ratio of the oxidant to the fuel employed, given as the ratio of moles of oxygen relative to moles of carbon in the liquid fuel (O/C), should be such that there is an insufficient amount of oxidant to completely oxidize all of the fuel into carbon dioxide ($CO_2$) and water ($H_2O$), i.e. the ratio should be fuel-rich. A preferred oxidant to fuel ratio for diesel fuel ranges from about 0.8/1 to about 1.4/1. The ratio of steam to carbon (S:C), calculated as moles of steam to moles of carbon in the liquid fuel, should be sufficient to maintain a self-sustaining oxidation process within the desired selectivities to CO and $H_2$, while keeping the gaseous reformate stream after heat exchange to a temperature less than about $400°$ C. A preferred S:C ratio ranges from about 0.8/1 to about 2.0/1.

The fuel entering the nozzle and up to exiting the nozzle is "cold;" that is, the fuel is maintained at a temperature below the temperature at which the fuel starts to decompose creating coke deposits. The nozzle may be of any type, for example, based on pressure atomization, air blast, ultrasonic atomization, electrospray, or other type known in the art. The nozzle provides fine atomization of cold liquid fuel and uniform distribution of the atomized fuel within the inlet air or steam containing inlet air. Appropriate nozzles, in which reaction air and/or steam flow and/or fuel flow are used to atomize liquid fuel, are known in the art.

The apparatus is designed to locate the ignition source sufficiently close to the catalyst bed to ignite the reforming reaction, but at a sufficient distance from the nozzle to maintain cold atomization of the fuel. This is an important point distinguishing this invention from previous methods, for example, U.S. Pat. No. 4,381,187 and U.S. Pat. No. 4,255,121.

The catalyst bed comprises a catalyst suitable for supporting partial oxidation and reforming reactions. Preferably, the catalyst comprises one of the metals of Group VIII of the periodic system of elements, preferably, rhodium. The substrate on which the catalyst is supported preferably provides good mixing for the fuel/oxidizer mixture passing there through. To provide good mixing, the substrate preferably comprises a multiplicity of void volumes in substantially random order throughout the substrate. This may be best achieved by using porous metal or ceramic substrates or by using multiple ceramic or metal screens or foams.

The preferred catalyst bed geometry provides a decreasing mass flux of the reactive fuel-oxidant mixture through the catalyst bed, as disclosed in U.S. patent application Ser. No. 10/324,464 filed Dec. 19, 2002; the contents of which are incorporated herein in its entirety, particularly, the teachings at Paragraphs 0014-0031 including FIGS. 1 and 2. A more preferred example of such geometry comprises a Microlith® brand ultra-short-channel-length metal substrate, most preferably arranged in a coil, such that the reactive mixture is introduced in an inner diameter (ID) plenum and the reformed gas exits at the outer diameter (OD) of the coil. The substrate has deposited thereon one or more catalytic components, preferably, one or more Group VIII metals of the Periodic Table, more preferably, one or more noble metals selected from ruthenium, rhodium, palladium, osmium, iridium, platinum, silver, gold, and mixtures thereof. Preferred catalyst formulations could be used on different parts of the coil. Microlith® brand ultra-short-channel-length substrate is available from Precision Combustion, Inc., 410 Sackett Point Road, North Haven, Conn. As known therefrom, the term "ultra-short-channel-length" substrate refers to substrates having channel lengths ranging from about 25 microns (µm) (0.001 inch) to about 500 µm (0.02 inch) in length. Based on such short channel lengths, the substrates provide short contact times between the catalyst and the fuel-oxidant mixture.

The nozzle and the catalyst bed are preferably arranged in such a way that the stream of atomized fuel, mixed with air and steam, is distributed across the entry face of the catalyst bed. It is preferred that the flow rate of the reacting mixture through the catalyst bed is sufficiently high, as noted hereinbelow, such that significant amounts of partial oxidation products (i.e., CO and $H_2$) are formed. When partial oxidation products are formed, as compared with complete oxidation products ($CO_2+H_2O$), less heat is released thereby resulting in lower temperatures of the catalyst bed. Moreover, the CO and $H_2$ reformate has a substantial heating value, that is, potential for producing energy.

The heat/ignition source is required for the initial pre-heat of the catalyst to the temperature where the catalytic oxidation reaction between the fuel and the oxidant can ignite ("light-off"). The heat source may be of any type known in the art. An electrically heated glow plug is a preferred heat source. Once the catalyst is lit-off, the heat/ignition source may be shut off (de-energized); and the catalytic reaction will be self-sustaining. After the igniter is shut-off, the heat for vaporizing the atomized fuel is derived from radiative heat from the catalyst.

Advantageously, the reformer is operated at a temperature greater than about 800° C. and less than about 1,000° C. and a pressure between about 1 atmosphere (atm) (101 kPa) and about 10 atm (1,013 kPa). A total flow rate of fuel plus oxidant plus steam advantageously ranges from greater than about 10,000 $hr^{-1}$ to less than about 500,000 $hr^{-1}$.

The heat exchanger positioned downstream of and in fluid communication with the catalyst bed can be any type of a heat exchanger known in the art. The heat exchanger should be placed such that the gaseous reformate flow exiting the catalyst bed passes on the hot side of the heat exchanger, from whence the collected heat is passed through the heat exchanger to its cold side, which contacts the supply of water. The heat exchanger thusly cools the exiting reformate gas to a temperature required for entry into a downstream unit, such as a de-sulfurization unit, namely, to a temperature less than about 400° C. Steam produced on the water side is cycled to the nozzle, thereby providing steam to the catalytic reaction.

In a preferred embodiment of the invention, a sulfur removal bed (de-sulfurization unit) may be placed in fluid communication with the heat exchanger. In this embodiment, the cooled reformate stream containing sulfur in the form of hydrogen sulfide ($H_2S$) exiting the heat exchanger passes through the sulfur removal bed to provide a sulfur-free reformate stream. As used herein, the term "sulfur-free" shall mean that the sulfur concentration in the reformate stream is less than about 10 parts per million ($ppm_v$), preferably, less than about 5 $ppm_v$, and more preferably, less than about 1 $ppm_v$.

The method and system of the present invention provide gasification of liquid fuel without a requirement for supplying external heat or external steam to the gasifier, that is, no vaporizer is required. Fuel and air may be supplied to the gasifier at ambient temperatures avoiding coking and clogging of the fuel-oxidant delivery system. This also allows a means for rapid, cold start-up and operation in the absence of heat at the reactor inlet.

Figure 1:
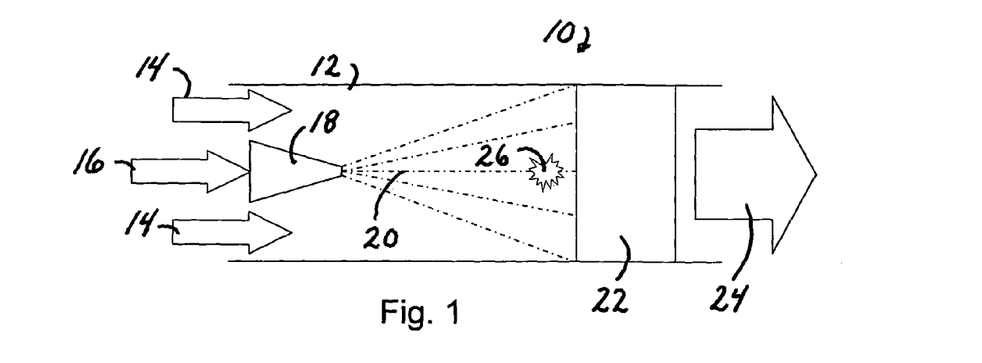
FIG. 1 depicts a schematic representation of an embodiment of a known gasification system.

As described in US 2005/0028445 A1 and depicted schematically in FIG. 1, a typical straight-flow gasification system (10) comprises a path (12) defining a flow of air (14). Fuel stream (16) is introduced into injector (18), which atomizes fuel stream (16). Atomized fuel (20) and air (14) enter catalyst bed (22) where fuel (20) is additionally mixed, vaporized and partially reformed. Gasified fuel stream (24) leaves the catalyst bed (22). Ignition source (26), in close proximity with catalyst bed (22), is used to initiate the process.

Figure 2:
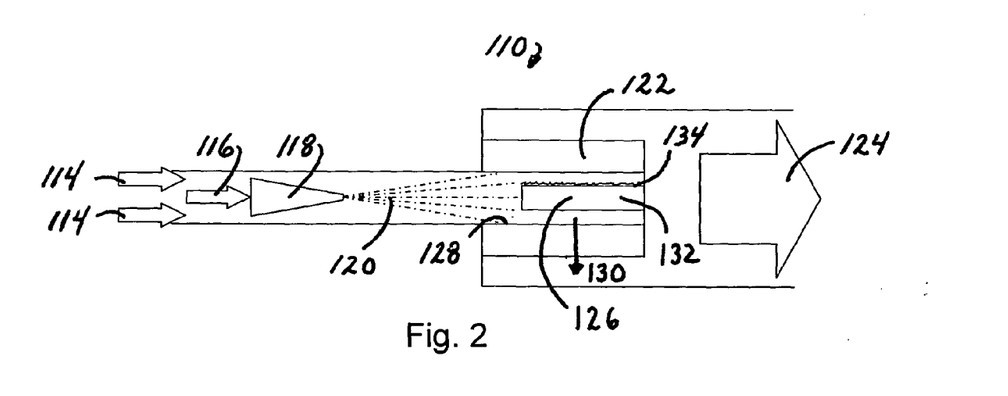
FIG. 2 depicts a schematic representation of another embodiment of a known gasification system.

As described in US 2005/0028445 A1, FIG. 2 schematically depicts an alternative gasification system (110). Functional elements corresponding to those depicted in FIG. 1 are referenced by corresponding 100-series reference numbers. In this embodiment, catalyst bed (122) defines a cylindrical shape and comprises a wound catalytically coated, short-contact-time, ultra-short-channel-length substrate. Atomized fuel (120) and airflow (114) enter into the inner diameter (128) of catalyst bed (122) and flow out radially (130) through catalyst bed (122). The igniter (126) in this embodiment comprises an electric glow plug (132) placed inside inner diameter (128) of catalyst bed (122). Glow plug (132) may be coated with catalyst (134) to further assist the start up process. Electric current initially is supplied to glow plug (132) to preheat catalyst bed (122) to the start up temperature. Fuel stream (116) is introduced into injector (118), and air (114) is then mixed with atomized fuel (120) causing catalyst bed (122) to heat up to the operating temperature at which point the electric current to the glow plug (132) is stopped. Gasified fuel stream (124) exits the system (110).

Figure 3:
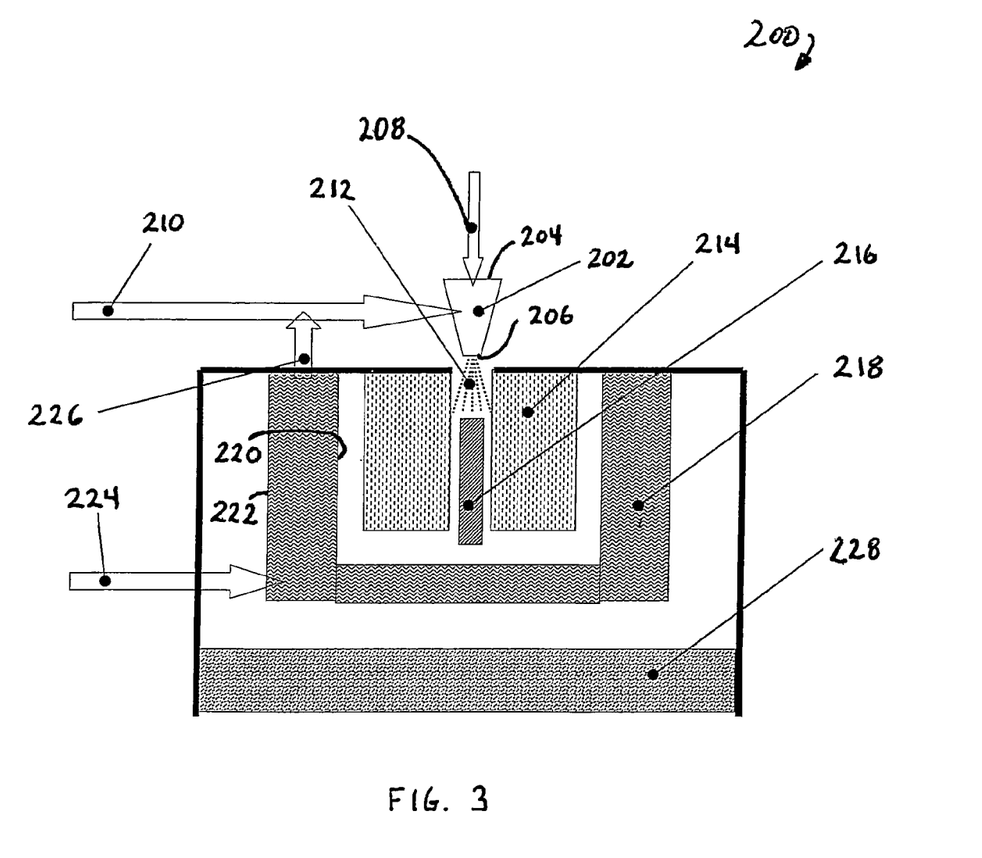
FIG. 3 depicts a diagrammatic representation of a detailed design of a gasification system according to the present invention.

FIG. 3 depicts a diagrammatic representation of a design of a gasification system (200) according to the present invention for converting liquid fuels into gas mixture containing CO and $H_2$ (syngas). The system (200) is comprised of a nozzle (202) having an inlet (204) and an outlet (206). A cold fuel liquid stream (208) and an inlet oxidizer stream (210) are introduced into the inlet (204) (which inlet may have more than one orifice as noted hereinafter). Steam from supply line (226) is fed into the oxidant inlet line (210), and the resulting mixture of oxidant and steam are fed into the nozzle (202). Although it is not shown in FIG. 3, it is important to recognize that the nozzle (202) comprises a tube for feeding the fuel separately from the oxidant-steam mixture; that is, the fuel does not contact the heated oxidant-steam mixture until just after exit outlet (206) of the nozzle. In this manner, the fuel remains cool until it contacts the heated oxidant-steam mixture. A nozzle exhaust stream (212) comprising atomized liquid fuel mixed with oxidizer and steam exits nozzle (202) at outlet (206). Catalyst bed (214) is in fluid communication with the nozzle exhaust stream (212). The system (200) further comprises a heat source (216) for igniting the catalyst bed (214). A heat exchanger (218) is in fluid communication with, or placed in close proximity with, the catalyst bed (214) and the nozzle (202).

Atomized liquid fuel exits the nozzle (202) in exhaust stream (212) which further comprises an oxidizer and steam. In most applications, oxygen as a constituent of air is a preferred oxidizer. The ratio of the fuel stream to the oxidizer stream should be such that there is insufficient amount of oxidizer to completely oxidize all fuel into $CO_2$ and $H_2O$, (i.e., the ratio should be fuel rich).

Exhaust stream (212) is distributed across the entry face of the catalyst bed (214). Preferably, the reactive mixture comprising exhaust stream (212) is introduced in the inner diameter (ID) plenum of the catalyst bed (214) and the reformed gas exits at the outer diameter (OD) of the catalyst bed (214) coil.

The heat/ignition source (216) is placed in close proximity with the catalyst bed (214), that is, a location sufficiently close in order to pre-heat the catalyst bed (214) to the temperature where the oxidation reaction between the fuel and the oxidant ignite. Gaseous reformate flow exits the catalyst bed (214) in fluid communication with a first side (220) (hot side) of heat exchanger (218). The gaseous reformate is then cooled to a temperature preferably less than about 400° C., by passing through, or in close proximity with, heat exchanger (218). The second side (cold side) (222) of heat exchanger (218) vaporizes cold liquid water stream (224) to produce steam (226), which is fed to the nozzle (202) through oxidizer supply line (210).

If desired, a sulfur removal bed (228) may be placed in fluid communication with the first or hot side (220) of heat exchanger (218). In this embodiment, the cooled reformate stream containing sulfur in the form of $H_2S$ exiting the heat exchanger (218) passes through the sulfur removal bed (228) to provide a sulfur free reformate stream. The term "sulfur free" means that the sulfur concentration in the reformate stream is less than about 10 parts per million volume ($ppm_v$), preferably, less than about 5 $ppm_v$, and more preferably, less than about 1 $ppm_v$.

Figure 4A:
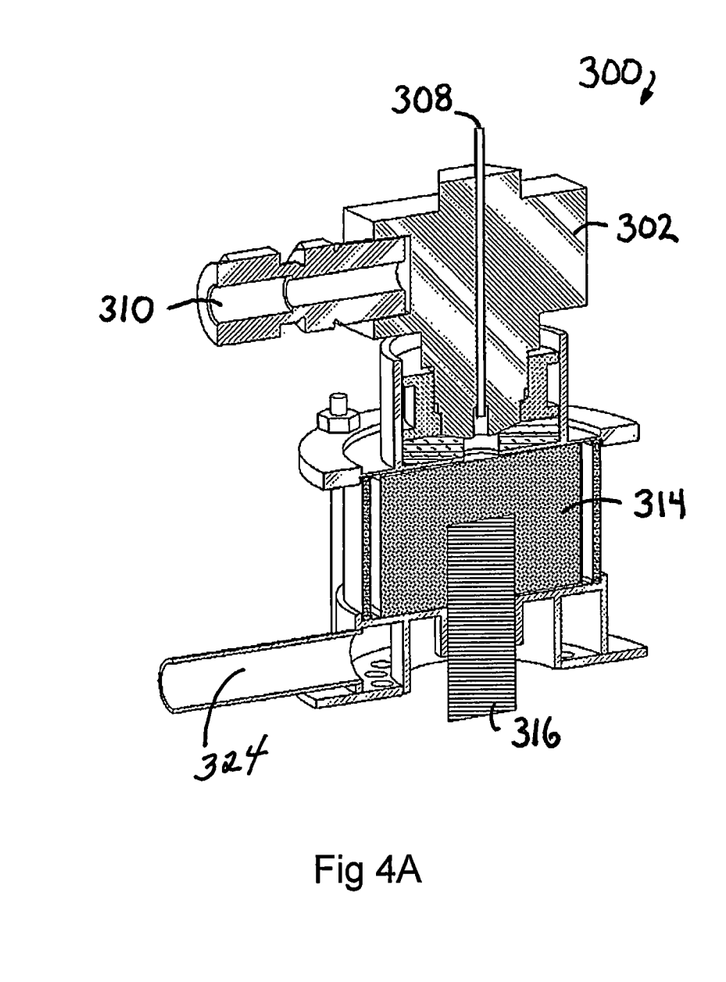
FIGS. 4A and 4B provide a three-dimensional rendering of a detailed design of a gasification system according to the present invention.
Figure 4B:
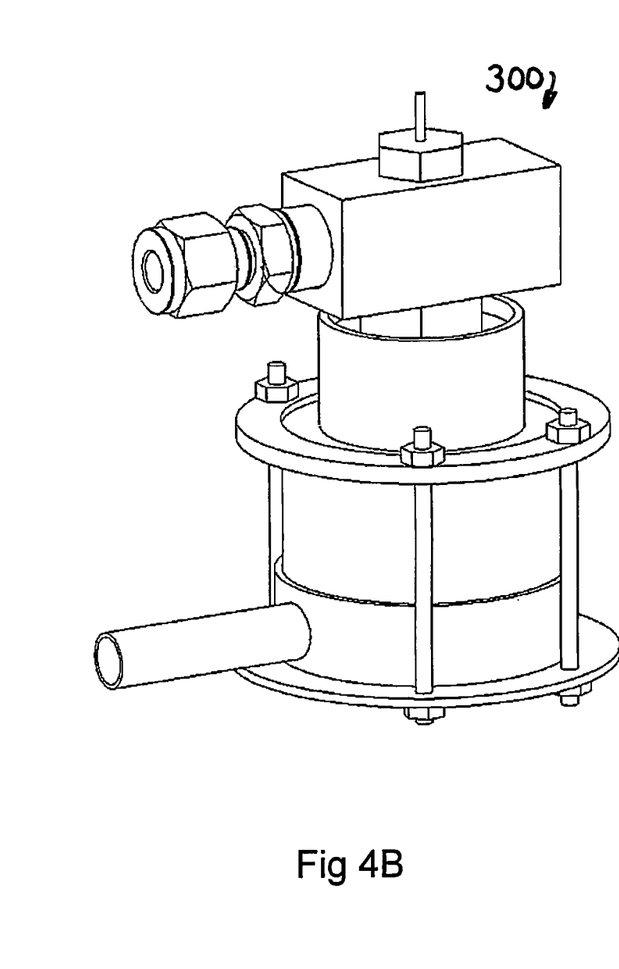

FIGS. 4A and 4B provide a three-dimensional rendering of detailed design of an actual gasification system (300) simulating the present invention. This system is also referred to as an "Auto Thermal Reforming Reactor" (ATR). In this embodiment, the steam was obtained from an outside source and fed into air inlet (310) as a means of testing the reforming of a liquid fuel in the presence of steam. The ATR comprised a coiled catalyst bed (314), a fuel atomization nozzle (308), an air and steam inlet (310), an exhaust line (324), and a start up glow plug (316). The reactor comprised the core of the reforming system, which system can be further incorporated into a system comprising a heat exchanger/steam generator, ZnO de-sulfurization bed, and fuel, air and water pump, these features of the invention not shown in FIG. 4. The ATR was enclosed in a quartz housing to enable visual observation of catalyst temperature uniformity. FIG. 4B depicts the apparatus within its housing. The reactor was also equipped with eight thermocouples for studying temperature distribution within the catalyst bed.

Figure 5:
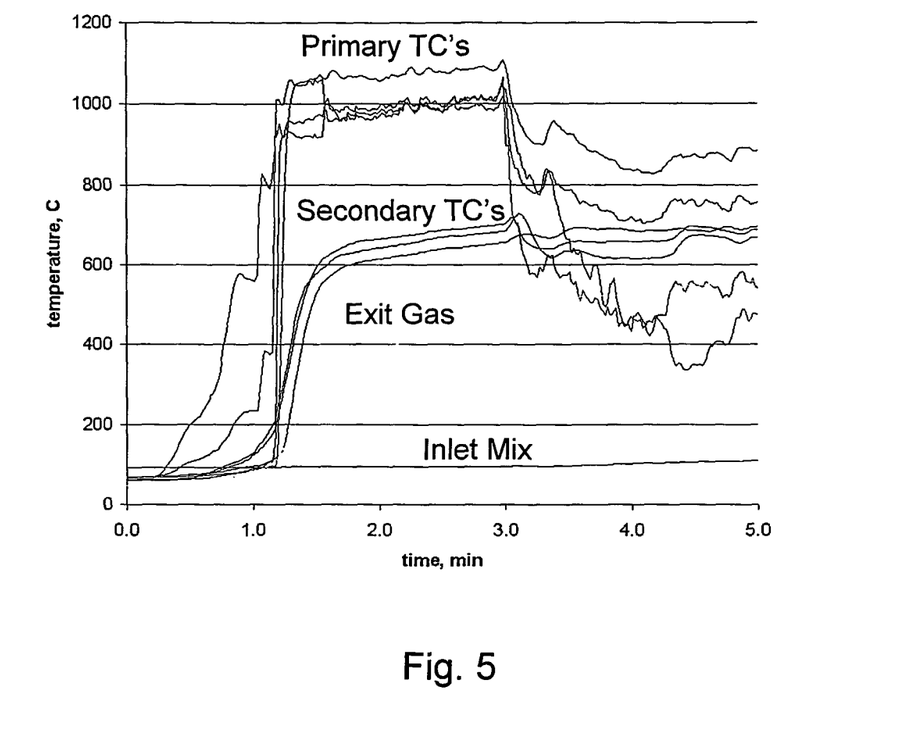
FIG. 5 provides a graphical representation of light-off temperature versus time in a gasification system according to the present invention.

The glow plug permits the reactor to lightoff at ambient conditions. In order to start the reactor in this particular embodiment, a 12 V DC potential was applied to the glow plug providing heat directly to the catalyst. This resulted in the catalyst temperature increasing to above lightoff temperature in about 30 seconds. Fuel flow, JP-8 fuel, was then started resulting in the reactor lightoff and transition to operational state in about 1 minute. As the catalyst lit off, the glow plug was shut off and steam flow to the reactor was started. This caused a temperature decrease on the front of the catalyst bed. To offset the drop in temperature, more air was added to the reactor and complete fuel conversion was achieved. Reactor temperatures during and after the light-off process at the primary and secondary thermocouples (TC's) and at the inlet mixture and exiting gaseous reformate are shown in FIG. 5. It is seen from FIG. 5 that light-off from ambient temperature was rapid, reaching an operating temperature of 1,000° C. in less than 20 seconds at about 1 minute on stream.

Figure 6:
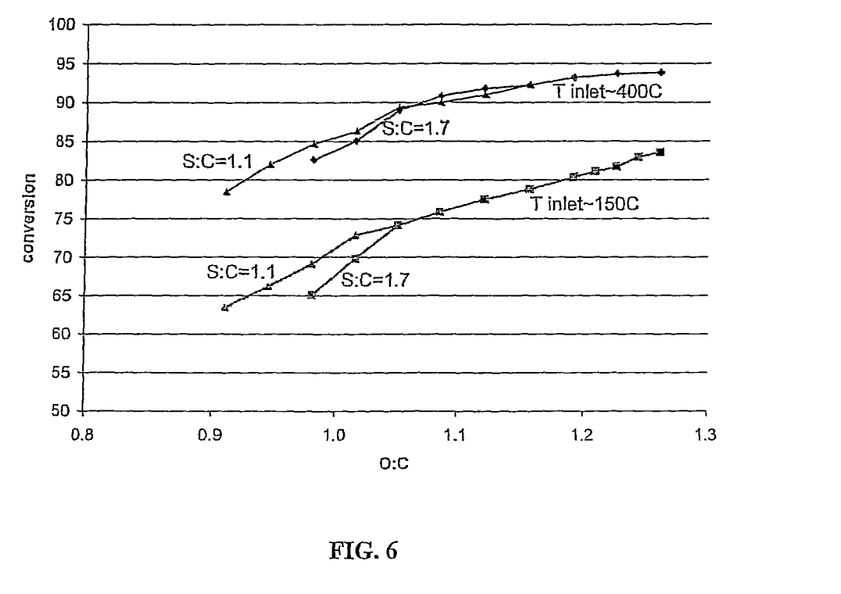
FIG. 6 provides a graphical representation of the dependence of fuel conversion on the air-to-fuel ratio (O/C mole ratio) in a gasification system according to the present invention.

The reformate gas was analyzed by gas chromatography (GC) at various air-to-fuel (O/C) mole ratios to measure the gas composition and the reactor performance. The air-steam inlet temperature and the steam-to-fuel (S:C) ratio were then varied, and the O:C scan was repeated to measure the dependence of the ATR performance on air-steam inlet temperature, O/C ratio, and S/C ratio. The results are provided in FIG. 6. It was found that the reactor could be operated with low water addition (S:C~1). It was also found that increasing the air-steam inlet temperature from 150° C. to 400° C. improved reactor performance. At 400° C. and S:C=1.1, the JP-8 reforming efficiency (LHV based) was 65%. Note that due to equipment tolerances, analytical considerations resulted in a maximum 95% material balance. The flattening of the conversion curve indicates that this corresponded in actuality to essentially complete fuel conversion.

Figure 7:
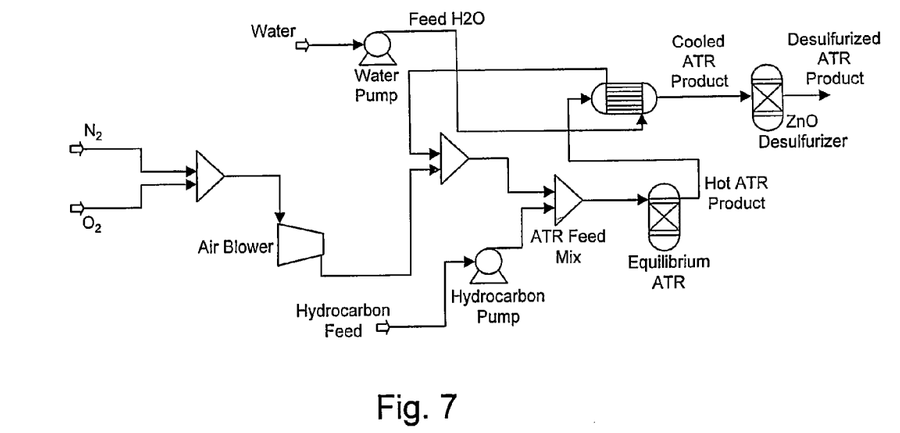
FIG. 7 provides a schematic flow diagram of a gasification system according to the present invention.

ASPEN® modeling was used to examine and determine the system layout including sensitivities to water addition/recycle/recapture and their associated impacts. The system configuration is illustrated in FIG. 7. The system operates at approximately 1-2 atm. The ATR feed water is delivered to a heat exchanger where it is vaporized prior to mixing with air supplied at the same pressure. The steam/air mix is combined with hydrocarbon fuel (represented by dodecane) through a nozzle, prior to delivery to the ATR. The ATR is represented as an adiabatic reactor yielding an equilibrium product distribution. The hot ATR product serves as the heat source for vaporizing the feed water. This is a benefit because it allows low temperature valving to be used to control the reformate flows.

Typically, in the ASPEN® modeling, the feed O/C ratio was fixed and two convergence criteria were imposed on the simulation. The first required that the temperature of the steam exiting the heat exchanger was sufficient to achieve a specified ATR mixed feed temperature (300° C.-400° C.), i.e., temperature of the in-flowing fuel-oxidant-steam mixture. The second required that the temperature of the cooled ATR product leaving the heat exchanger be compatible with effective sulfur removal in a downstream de-sulfurization unit using a ZnO bed (typically 300°-350° C.). This was controlled by regulating the water feed rate. Thus, for a given O/C, the S/C ratio was that value which simultaneously satisfied these two requirements. Case studies showed that there was a preferred O/C range (~1.1-1.2) below which target ATR feed temperatures could not be achieved and above which system efficiencies, specifically, fuel conversion and selectivities to $H_2$ and CO, declined excessively. As an example, at a fixed O/C of 1.2, acceptable operation for a 400° C. target ATR feed temperature and a 300° C. ATR product temperature exiting the heat exchanger, could be obtained at a feed S/C of 2.16. The resultant lower heating value-based (LHV) thermal efficiency for these conditions was ~75% for the reforming system, including Balance of Plant (BOP) parasitics, but not including fuel-cell efficiency if that application was contemplated. Without a fuel cell, heat integration was relaxed in the system prototype. When operating with a SOFC stack, heat integration and water-recovery from the downstream SOFC will be required.

Figure 8:
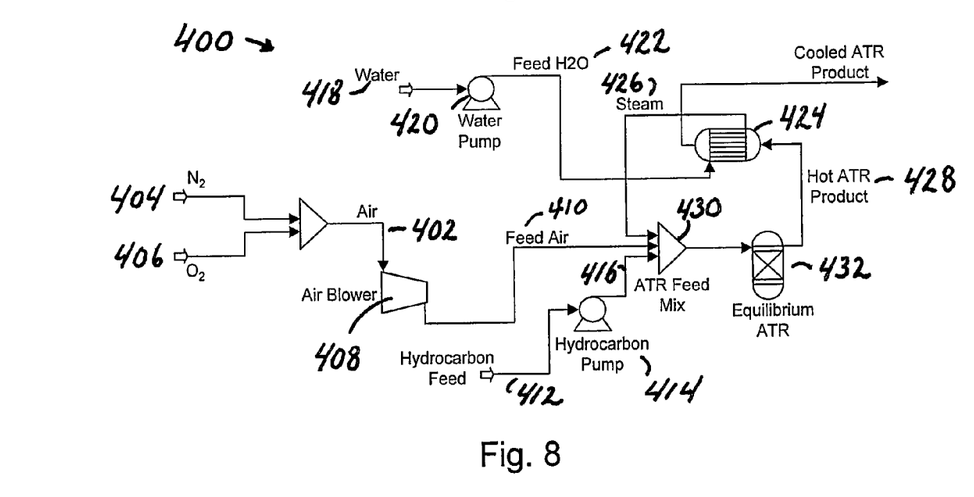
FIG. 8 depicts a schematic flow diagram of a system for onboard reforming of fuel and production of hydrogen in accordance with the present invention.
Figure 9:
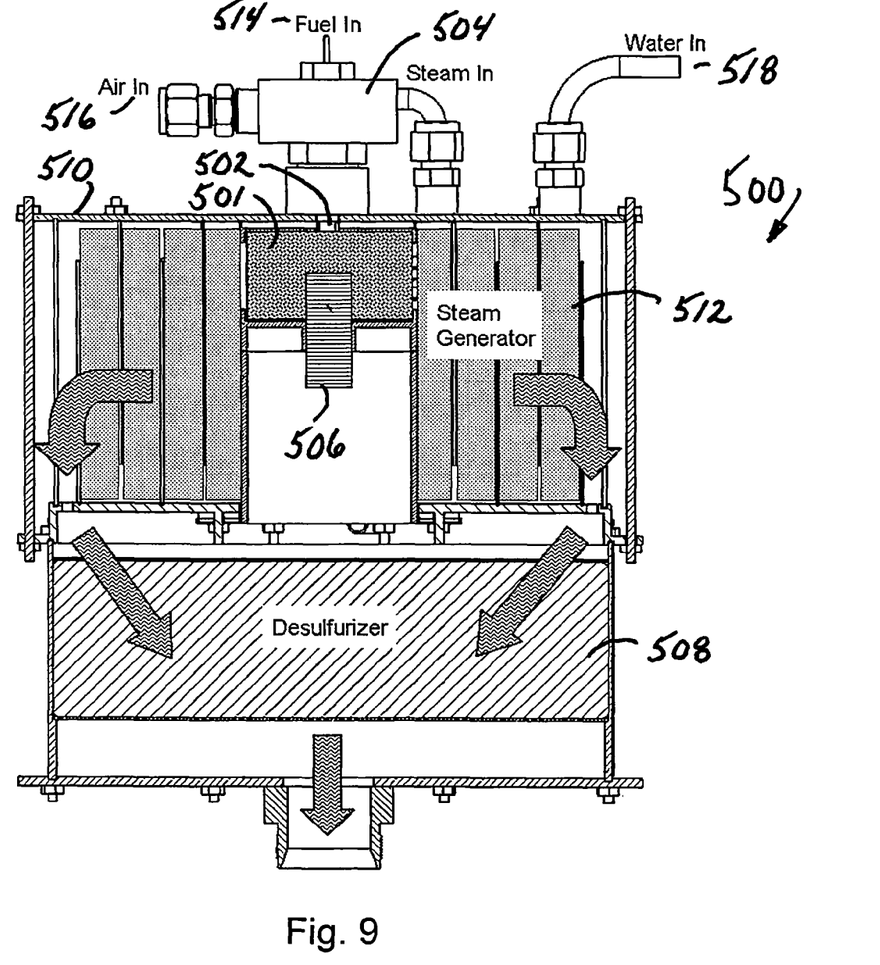
FIG. 9 depicts a cut-away diagram of a system for onboard reforming of fuel and production of hydrogen in accordance with the present invention.

Another embodiment of the present invention is illustrated schematically in FIG. 8, which depicts a flow diagram of a system for onboard reforming of fuel and production of hydrogen in accordance with the present invention. As used herein, the term "onboard" means that the reforming system is a liquid fuel pre-reformer, the gaseous product of which is further reformed or combusted downstream, such as, in a fuel cell stack or an automotive internal combustion engine. Fuel reforming system 400 comprises a supply of air 402 that, in turn, comprises oxygen 404 and Nitrogen 406. Air 402 is passed through a compressor 408 and feed air 410 is passed to an ATR Feed Mixer 430. A hydrocarbon source stream (fuel) 412 is passed through a feed pump 414 and the hydrocarbon feed 416 is passed to ATR Feed Mixer 430. The fuel/air mixture exits ATR Feed Mixer 430 and is passed to an Equilibrium ATR 432. A glow plug may be used for startup of the reactor (as shown in FIG. 9 and described with respect thereto). Hot ATR product 428 is passed to heat exchanger (or steam generator) 424. Water 418 is passed to feed water pump 420 and feed water 422 is passed to heat exchanger 424. Steam 426 exits heat exchanger 424 and is passed back to ATR Feed Mixer 430. Cooled ATR product exits the system.

Another embodiment of the present invention is illustrated in FIG. 9. Fuel reforming system 500 of the present invention comprises a coiled reactor 501, a fuel injector/atomizer 504, a mixing region 502, and a glow plug 506 for startup. Advantageously, a de-sulfurizer 508 is added to system 500. The system is contained within an appropriate housing 510 that further houses steam generator 512. System 500 further comprises a fuel input 514, an air input 516, and a water input 518.

Figure 10:
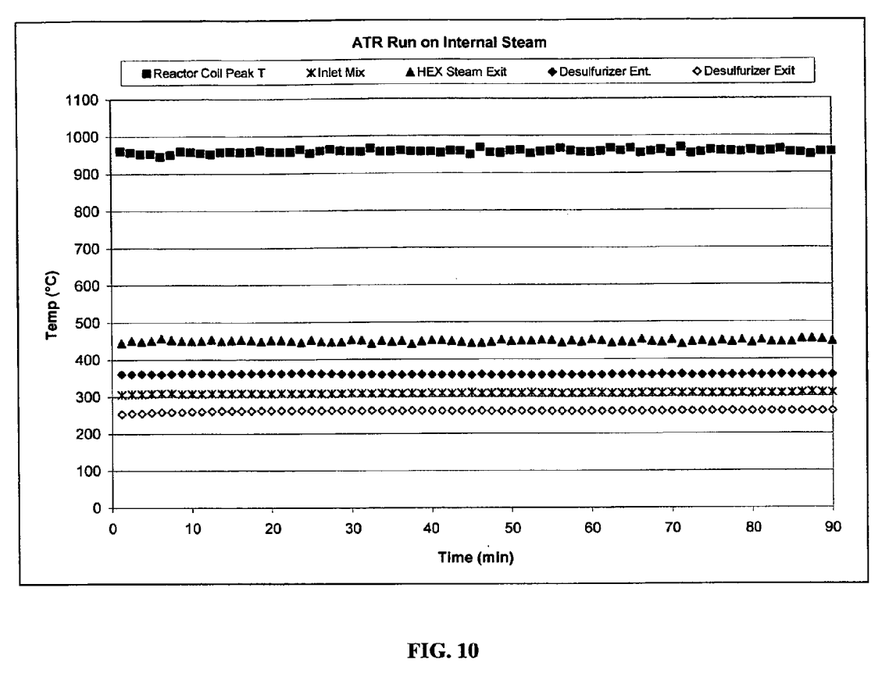
FIG. 10 provides a graphical representation of the results achieved from running the embodiment illustrated in FIG. 9.

The results of running the ATR reactor of FIG. 9 in a specific process embodiment of the invention using internal steam generated from within the system are shown in FIG. 10. JP-8 fuel having a sulfur concentration less than 15 ppm, was used, where the sulfur was present as organosulfur compounds native to the fuel. Steady state operating conditions were as follows. The O/C ratio was 0.95; the S/C ratio was 0.90. Operation was at atmospheric pressure. The fuel was fed to the ATR reactor at 7 g/min, while the air and water were fed at 27.5 standard liters per minute (slpm) and 8.1 slpm, respectively. The results show that the ATR operating temperature remained substantially constant over the run time of 90 minutes, where the peak reactor coil temperature was within the range of 950° C. to 970° C. The temperature of the air-steam inlet mixture remained essentially constant at about 310° C., as did the steam temperature at about 450° C. exiting the heat exchanger. The reformate gas entering and exiting the de-sulfurization unit held steady at temperatures of 360° C. and 260° C., respectively. The use of a de-sulfurization unit reduced the amount of sulfur exiting the system to a value of less than 1 ppm$_v$.

Figure 11:
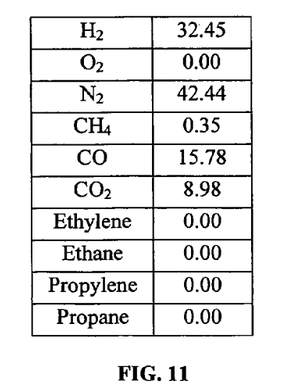
FIG. 11 provides a tabular representation of the results achieved from running the embodiment illustrated in FIG. 9.

FIG. 11 provides a tabular representation of the resultant stream rates (concentrations) of the system illustrated in FIG. 9. It is seen that $H_2$ and CO were the major products, that low molecular weight hydrocarbons (methane, ethane, ethylene, propane and propylene) were present in acceptably low concentrations if at all, and oxygen was completely consumed. It was surprising that the system could be operated in such a steady manner, with neither slow-down nor run-away reaction occurring. Slow-down would have decreased the temperature of the reactant mixture and catalyst with consequential decrease in fuel conversion and increase in coking around the nozzle and catalyst. Run-away reaction would have increased the temperature of the reactant mixture and catalyst with consequential loss of selectivities to CO and $H_2$ and over-heat of the reformatted flow into the de-sulfurization unit.

Although the invention has been described in considerable detail with respect to reactively converting a liquid fuel into a gasified stream by partial oxidation, and the reforming of diesel fuel utilizing an ATR reactor, it will be apparent that the invention is capable of numerous modifications and variations, apparent to those skilled in the art, without departing from the spirit and scope of the invention.

The invention claimed is:

1. A process of reforming a liquid fuel comprising:
    (a) providing a supply of a liquid fuel selected from the group consisting of diesel, kerosene, dodecane, light oil, JP-8, JP-5, and Jet A fuels;
    (b) providing a supply of an oxidant;
    (c) providing a supply of liquid water;
    (d) atomizing the liquid fuel through a nozzle into a mixer such that the fuel entering the nozzle and before exiting the nozzle is maintained at a temperature below the coking temperature of the fuel;
    (e) feeding the oxidant into the mixer and mixing the atomized fuel with the oxidant;
    (f) catalytically reacting the fuel-oxidant mixture in the presence of steam in a catalytic reactor thereby producing gaseous reformate; wherein the catalytic reactor comprises an ultra-short-channel-length metal substrate in a coiled configuration having an inner diameter and an outer diameter and a radial flow path, and having supported thereon one or more noble metals; wherein the catalytically reacting employs a ratio (O/C) of moles of oxygen in the oxidant to moles of carbon in the liquid fuel ranging from 0.8/1 to 1.4/1 and a ratio (S/C) of moles of steam to moles of carbon in the liquid fuel ranging from 0.8/1 to 2.0/1;
    (g) initiating the catalytic reaction of step (f) with an ignition source located proximate to the catalytic reactor but at a distance from the nozzle sufficient to maintain the temperature requirement of step (d);
    (h) contacting the gaseous reformate with a heat exchanger positioned downstream of and in fluid communication with the catalytic reactor, such that a hot side of the heat exchanger contacts the gaseous reformate and a cold side of the heat exchanger contacts the supply of water; and further such that the heat exchanger is displaced radially with respect to a center axis of the catalytic reactor and wherein the gaseous reformate exits through the radial flow path of the catalytic reactor and contacts the heat exchanger in a crossflow direction;
    (i) transferring heat from the gaseous reformate via the heat exchanger to the liquid water to produce steam; and
    (j) providing the steam to the fuel-oxidant mixture in the catalytic reaction of step (f).

2. The process of claim 1 wherein the oxidant comprises oxygen or air.

3. The process of claim 1 at step (f) operated at a temperature in a range from 800° C. to 1000° C. and a pressure in a range from 1 atm (101 kPa) to 10 atm (1,013 kPa).

4. The process of claim 1 wherein the ultra-short-channel-length metal substrate has a channel length ranging from 25 μm to 500 μm, and the substrate is wound into a cylindrical coil.

5. The process of claim 1 wherein the gaseous reformate exiting the heat exchanger has a temperature less than 400° C.

6. The process of claim 1 wherein the ignition source consists of a glow plug or a spark plug.

7. The process of claim 1 wherein the gaseous reformate comprises hydrogen and carbon monoxide.

8. The process of claim 1 wherein the fuel, oxidant, and steam are fed into the catalytic reactor at a total flow rate from greater than 10,000 $hr^{-1}$ to less than 500,000 $hr^{-1}$.

9. A process of reforming a liquid fuel comprising:
   (a) providing a supply of a liquid fuel selected from the group consisting of diesel, kerosene, dodecane, light oil, JP-8, JP-5, and Jet A fuels;
   (b) providing a supply of an oxidant;
   (c) providing a supply of liquid water;
   (d) atomizing the liquid fuel through a nozzle into a mixer such that the fuel entering the nozzle and before exiting the nozzle is maintained at a temperature below the coking temperature of the fuel;
   (e) feeding the oxidant into the mixer and mixing the atomized fuel with the oxidant;
   (f) catalytically reacting the fuel-oxidant mixture in the presence of steam in a catalytic reactor thereby producing gaseous reformate; wherein the catalytic reactor comprises an ultra-short-channel-length metal substrate in a coiled configuration having an inner diameter and an outer diameter and a radial flow path, and having supported thereon one or more noble metals; wherein the catalytically reacting employs a ratio (O/C) of moles of oxygen in the oxidant to moles of carbon in the liquid fuel ranging from 0.8/1 to 1.4/1 and a ratio (S/C) of moles of steam to moles of carbon in the liquid fuel ranging from 0.8/1 to 2.0/1;
   (g) initiating the catalytic reaction of step (f) with an ignition source located proximate to the catalytic reactor but at a distance from the nozzle sufficient to maintain the temperature requirement of step (d);
   (h) contacting the gaseous reformate with a heat exchanger positioned downstream of and in fluid communication with the catalytic reactor, such that a hot side of the heat exchanger contacts the gaseous reformate and a cold side of the heat exchanger contacts the supply of water; and further such that heat exchanger is displaced radially with respect to a center axis of the catalytic reactor and wherein gaseous reformate exits through the radial flow path of the catalytic reactor and contacts the heat exchanger in a crossflow direction;
   (i) transferring heat from the gaseous reformate via the heat exchanger to the liquid water to produce steam;
   (j) providing the steam to the fuel-oxidant mixture in the catalytic reaction of step (f); and
   (k) feeding the gaseous reformate exiting the heat exchanger into a de-sulfurizer comprising a sulfur adsorbent.

10. The process of claim 9 wherein the gaseous reformate exiting the de-sulfurizer has a sulfur concentration of less than 10 $ppm_v$.

11. The process of claim 9 wherein the fuel, oxidant, and steam are fed into the catalytic reactor at a total flow rate from greater than 10,000 $hr^{-1}$ to less than 500,000 $hr^{-1}$.

* * * * *